US011149754B2

(12) United States Patent
Yoshihara et al.

(10) Patent No.: US 11,149,754 B2
(45) Date of Patent: Oct. 19, 2021

(54) ACCUMULATOR

(71) Applicant: EAGLE INDUSTRY CO., LTD., Tokyo (JP)

(72) Inventors: Hisao Yoshihara, Tokyo (JP); Shinya Kamimura, Tokyo (JP)

(73) Assignee: EAGLE INDUSTRY CO., LTD.

( * ) Notice: Subject to any disclaimer, the term of this patent is extended or adjusted under 35 U.S.C. 154(b) by 54 days.

(21) Appl. No.: 16/617,346

(22) PCT Filed: Jun. 27, 2018

(86) PCT No.: PCT/JP2018/024370

§ 371 (c)(1),
(2) Date: Nov. 26, 2019

(87) PCT Pub. No.: WO2019/004284

PCT Pub. Date: Jan. 3, 2019

(65) Prior Publication Data

US 2021/0140449 A1 May 13, 2021

(30) Foreign Application Priority Data

Jun. 29, 2017 (JP) ............................ JP2017-126983

(51) Int. Cl.
*F16L 55/04* (2006.01)
*F15B 1/10* (2006.01)

(52) U.S. Cl.
CPC .............. *F15B 1/103* (2013.01); *F15B 1/106* (2013.01); *F15B 2201/205* (2013.01);
(Continued)

(58) Field of Classification Search
CPC .... F15B 1/103; F15B 1/106; F15B 2201/205; F15B 2201/3151; F15B 2201/3155; F15B 2201/3158; F16L 55/04
(Continued)

(56) References Cited

U.S. PATENT DOCUMENTS 2,465,908 A 3/1949 Mercier
3,066,699 A * 12/1962 Peet ........................ F15B 1/106 138/30
(Continued)

FOREIGN PATENT DOCUMENTS

CN 202883510 U 4/2013
DE 2623951 A1 12/1977
(Continued)

OTHER PUBLICATIONS

Extended European Search Report for corresponding Application No. EP 18825240.7 dated Feb. 2, 2021 (7 pages).

*Primary Examiner* — James F Hook

(74) *Attorney, Agent, or Firm* — Harness, Dickey & Pierce, P.L.C.

(57) ABSTRACT

A diaphragm accumulator provided with a flexible diaphragm inside an accumulator housing has a stress relaxing member having a contact surface which the diaphragm deformed by a pressure fluctuation inside the accumulator housing contacts and regulating the deformed attitude of the diaphragm by the contact surface on the inner surface. When the diaphragm is deformed by the pressure fluctuation inside the accumulator housing, the stress relaxing member regulates the deformed attitude of the diaphragm to reduce a stress generated in the diaphragm.

2 Claims, 6 Drawing Sheets

(52) U.S. Cl.
CPC ................. *F15B 2201/3151* (2013.01); *F15B 2201/3155* (2013.01); *F15B 2201/3158* (2013.01)

(58) Field of Classification Search
USPC ............................................................ 138/30
See application file for complete search history.

(56) References Cited

U.S. PATENT DOCUMENTS

| | | | | | |
|---|---|---|---|---|---|
| 3,830,259 | A * | 8/1974 | Mercier | F16L 55/052 | 138/30 |
| 4,084,621 | A * | 4/1978 | Sugimura | F15B 1/14 | 138/30 |
| 4,192,350 | A * | 3/1980 | Mercier | F15B 1/14 | 138/30 |
| 5,992,832 | A * | 11/1999 | Lamorlette | B60G 11/30 | 138/30 |
| 6,186,178 | B1 * | 2/2001 | Darroux | F15B 1/10 | 138/26 |

FOREIGN PATENT DOCUMENTS

| | | | |
|---|---|---|---|
| DE | 2754606 | A1 | 6/1979 |
| JP | H06-40403 | U | 5/1994 |
| JP | H11-270501 | A | 10/1999 |
| JP | 2001-173601 | A | 6/2001 |
| JP | 2002-372002 | A | 12/2002 |
| JP | 2004-286193 | A | 10/2004 |
| JP | 2007-270872 | A | 10/2007 |
| WO | 2000-071898 | A1 | 11/2000 |

* cited by examiner

ACCUMULATOR

CROSS REFERENCE TO RELATED APPLICATIONS

This application is a U.S. National Phase application of International Application No. PCT/JP2018/024370, filed on Jun. 27, 2018 and published in Japanese as WO 2019/004284 A1 on Jan. 3, 2019 and claims priority to Japanese Patent Application No. 2017-126983, filed on Jun. 29, 2017. The entire disclosures of the above applications are expressly incorporated by reference herein.

BACKGROUND

Technical Field

The present invention relates to an accumulator and more specifically relates to a diaphragm accumulator provided with a flexible diaphragm inside an accumulator housing. The accumulator of the present invention is used as an on-board accumulator for automobiles, for example.

Related Art

Conventionally, a diaphragm accumulator 11 is known which has an accumulator housing 21 provided with a gas filling opening 22 and an oil port 23, in which a diaphragm 41 having flexibility is provided inside the accumulator housing 21 in such a manner as to divide the internal space of the accumulator housing 21 into a gas filled chamber 24 and a fluid chamber 25 as illustrated in FIG. 3. The gas filled chamber 24 leads to the gas filling opening 22. The fluid chamber 25 leads to the oil port 23.

The diaphragm 41 is a resin or rubber laminated structure integrally having an outer peripheral attachment portion 42, a flexible portion 43, and a reversing portion 44. The outer peripheral attachment portion 42 is held by a diaphragm holder 31 provided on the side inner surface of the accumulator housing 21. The flexible portion 43 is deformed according to a pressure fluctuation inside the accumulator housing 21. The reversing portion 44 is provided between the outer peripheral attachment portion 42 and the flexible portion 43 and integrally has a reversing portion having a substantially U-shaped cross-section deformed with the flexible portion 43.

The above-described accumulator 11 has room for further improvement in the following respects.

In the above-described accumulator 11, when a pressure fluctuation occurs inside the accumulator housing 21, the diaphragm 41 is deformed towards a pressure equilibrium point accompanying the pressure fluctuation. When an operation compression ratio (=Operation pressure/Filling gas pressure) increases at this time, the flexible portion 43 of the diaphragm 41 is greatly displaced to the gas filled chamber 24 side, so that the reversing degree of the reversing portion 44 increases, whereby the reversing portion 44 is pressed against the inner peripheral surface of the diaphragm holder 31. This causes the generation of an overstress in the reversing portion 44. The repetition thereof leads to a breakage of the diaphragm 41 in some cases.

For example, in the accumulator 11 of the Comparative Example illustrated in FIG. 4, an internal stress (stress ratio) to be generated changes as follows with an increase in the compression ratio as illustrated in FIGS. 5A-5D.

FIG. 5A/Compression ratio: 2.5

FIG. 5B/Compression ratio: 6.0→Stress ratio in comparison with FIG. 5A: 1.0

FIG. 5C/Compression ratio: 11.0→Stress ratio in comparison with FIG. 5A: 1.4

FIG. 5D/Compression ratio: 18.9→Stress ratio in comparison with FIG. 5A: 1.7

When brought into the state of FIG. 5D, the internal stress to be generated reaches 170%. Therefore, the repetition thereof leads to a breakage of the diaphragm 41 in some cases.

It is an object of the present invention to enable the relaxation of an internal stress generated in a diaphragm even when the operation compression ratio of an accumulator increases, and thus suppress a breakage of the diaphragm and improve the durability of the diaphragm.

SUMMARY

The accumulator of the present invention is provided with an accumulator housing, a flexible diaphragm provided inside the accumulator housing in such a manner as to divide inside the accumulator housing, and a stress relaxing member provided inside the accumulator housing and regulating a deformed attitude of the diaphragm deformed by the pressure fluctuation inside the accumulator housing by the contact of the diaphragm with the stress relaxing member.

Effect of the Invention

According to the present invention, even when the operation compression ratio of the accumulator increases, the internal stress generated in the diaphragm can be relaxed, and therefore a breakage of the diaphragm can be suppressed and the durability of the diaphragm can be improved.

DETAILED DESCRIPTION

Figure 1:
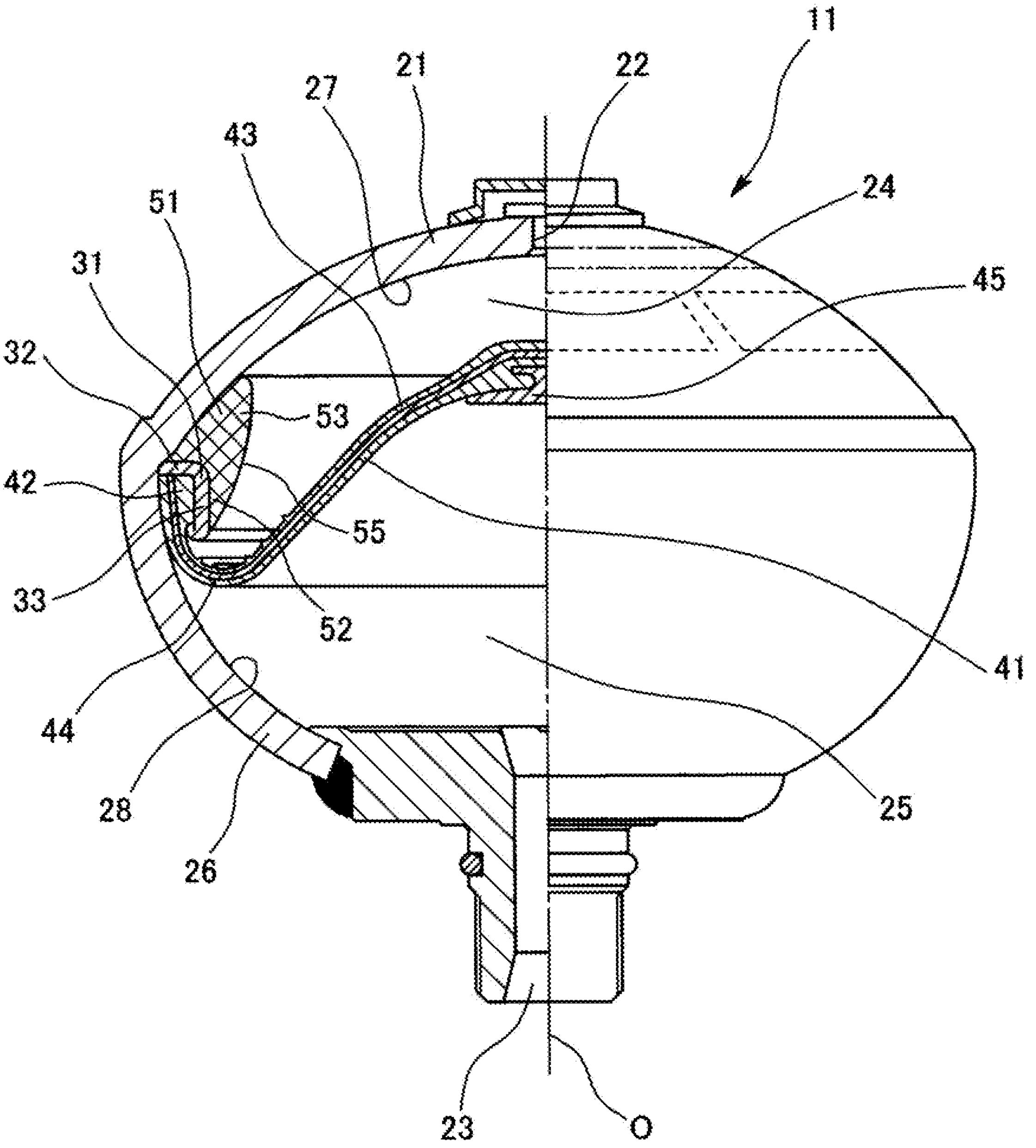
FIG. 1 is a cross-sectional view of an accumulator of an embodiment.
Figure 2:
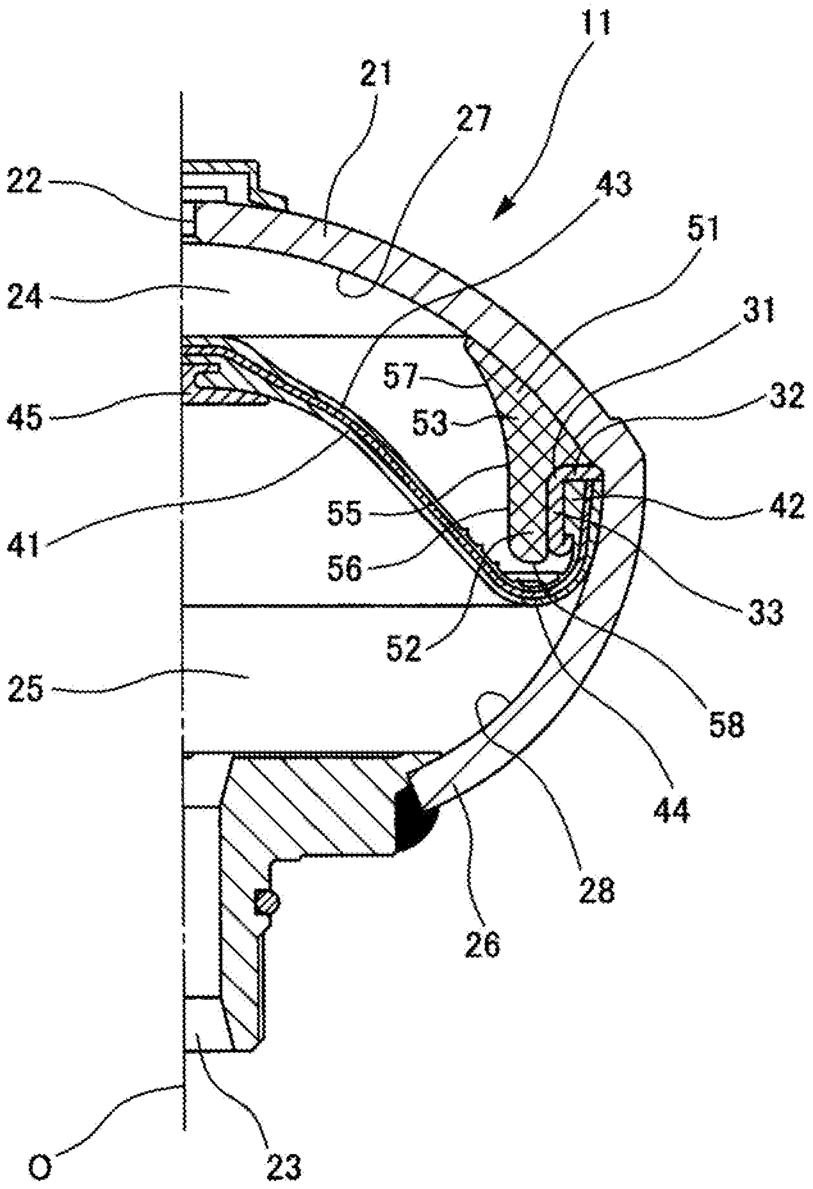
FIG. 2 is a cross-sectional view of an accumulator of another embodiment.
Figure 3:
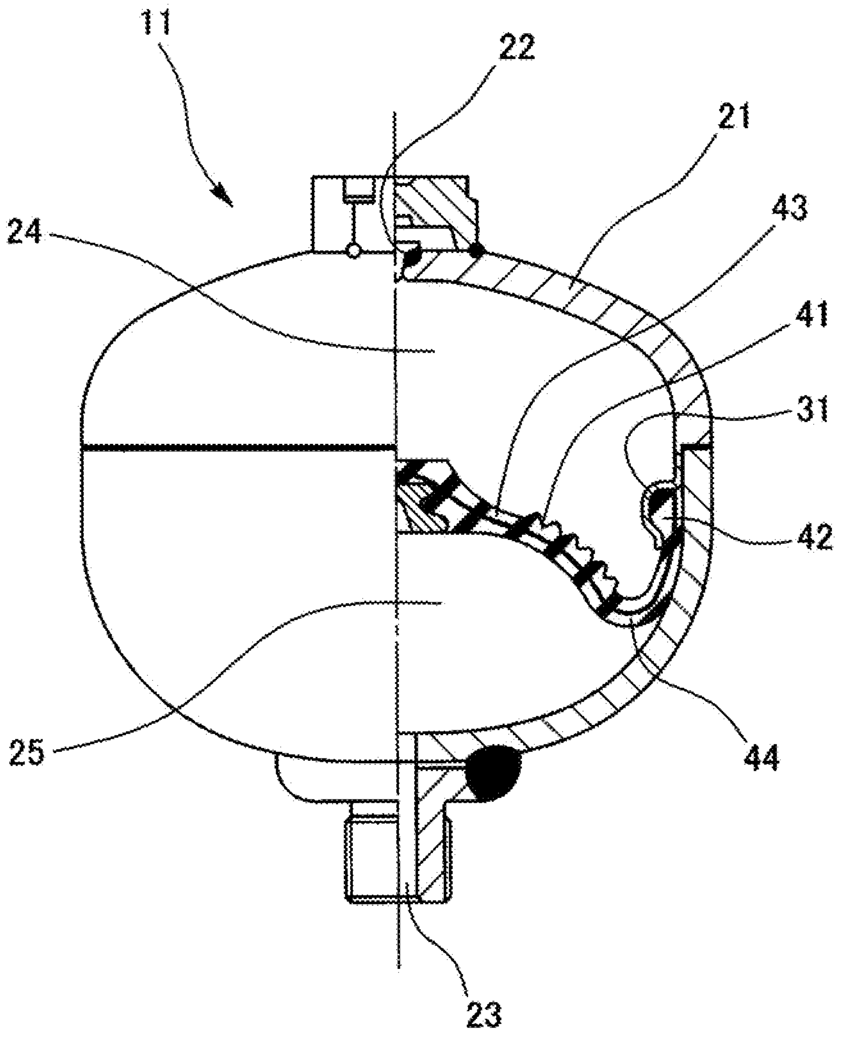
FIG. 3 Background Art
FIG. 3 is a cross-sectional view of an accumulator of the Background Art.
Figure 4:
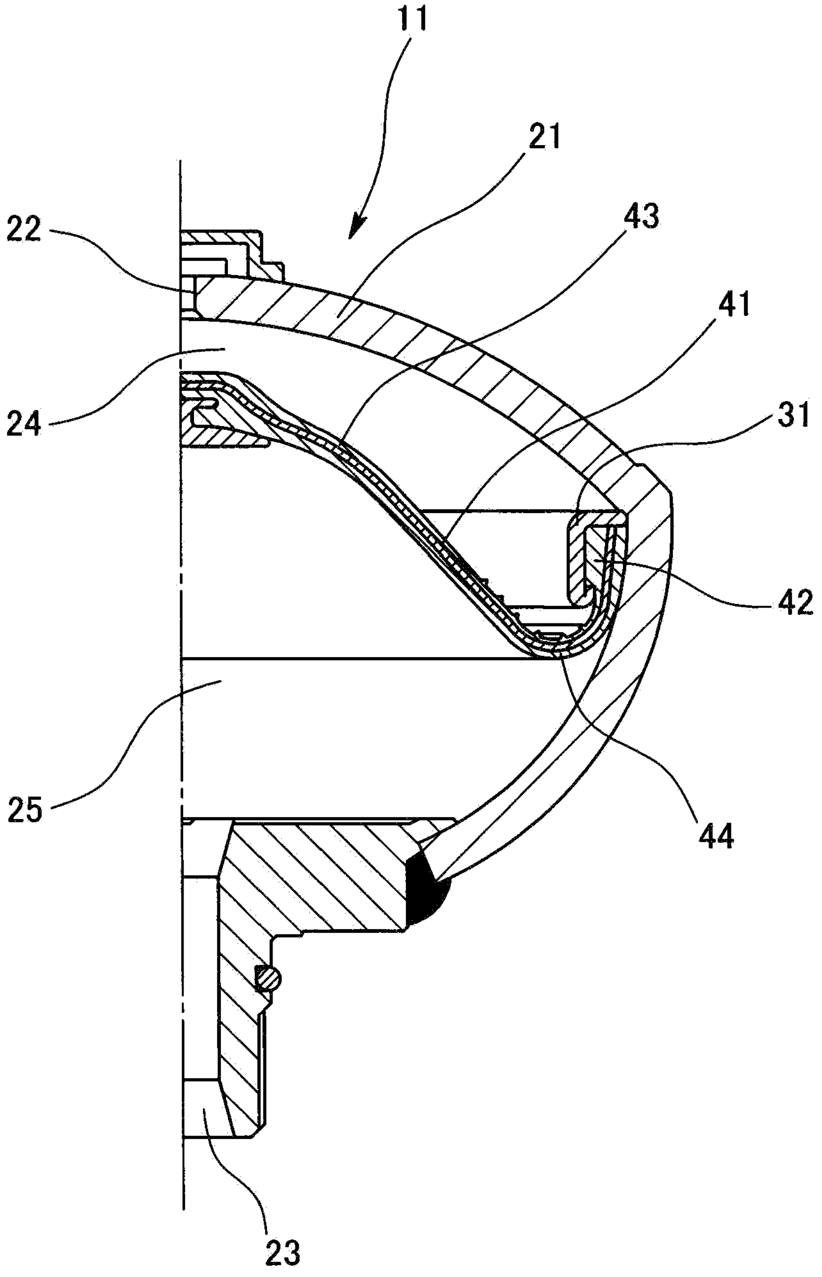
FIG. 4 Background Art
FIG. 4 is a cross-sectional view of an accumulator of a Comparative Example.
Figures 5A, 5B, 5C, 5D:
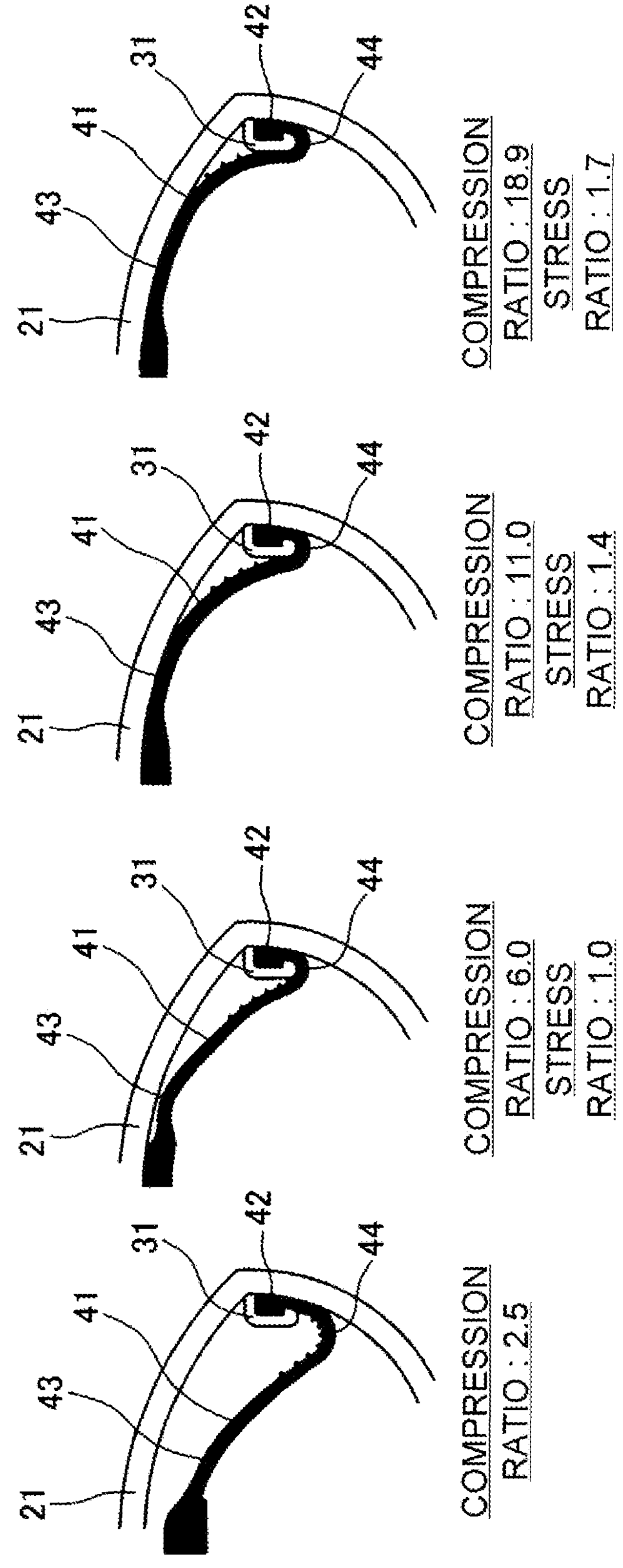
FIG. 5A Background Art
FIG. 5B Background Art
FIG. 5C Background Art
FIG. 5D Background Art
FIGS. 5A-5D are explanatory views illustrating changes in a compression ratio and a stress ratio in the accumulator.

An embodiment is described based on FIG. 1 and FIG. 2. The same portions as or portions equivalent to those of the accumulators illustrated in FIG. 3 and FIG. 4 are designated by the same reference numerals.

FIG. 1 illustrates a cross-sectional view in which an accumulator 11 of the embodiment is partially cut. The accumulator 11 of the embodiment is a diaphragm accumulator in which a diaphragm 41 having flexibility is provided inside an accumulator housing 21.

The accumulator 11 of the embodiment has the accumulator housing 21 provided with a gas filling opening 22 and an oil port 23, in which the diaphragm 41 having flexibility is provided inside the accumulator housing 21. The diaphragm 41 divides the internal space of the accumulator housing 21 into a gas filled chamber (gas chamber) 24 leading to the gas filling opening 22 and a fluid chamber (liquid room) 25 leading to the oil port 23.

The accumulator housing 21 has a shell 26 formed by drawing of a metal component and the inner surface thereof has a combined shape of curved surfaces 27, 28 having an arc-shaped cross-section. The curved surface formed on the inner surface of the housing 21 has a combination of the curved surface 27 on the gas filling opening side in a direction where the inner diameter dimension gradually enlarges from the gas filling opening 22 to the oil port 23 and the curved surface 28 on the oil port side in a direction where the inner diameter dimension gradually enlarges conversely from the oil port 23 to the gas filling opening 22. The curved surface 28 on the oil port side is formed by drawing from a cylindrical surface.

In the maximum inner diameter portion of the shell 26, an annular diaphragm holder 31 having a hook shape for holding the diaphragm 41 is provided. The diaphragm holder 31 integrally has a fixing portion 32 having an annular flat plate shape fixed to the inner surface of the accumulator housing 21 and a cylindrical hook 33 provided from the inner peripheral end of the fixing portion 32 to the oil port 23 side (lower side in the figure). The diaphragm holder 31 is formed into a hook shape having an L-shaped cross-section.

The diaphragm 41 is a resin or rubber laminated structure integrally having an outer peripheral attachment portion 42, a flexible portion 43, and a reversing portion 44. The outer peripheral attachment portion 42 is held by the diaphragm holder 31 provided on the side inner surface of the accumulator housing 21. The flexible portion 43 is deformed according to a pressure fluctuation inside the accumulator housing 21. The reversing portion 44 is provided between the outer peripheral attachment portion 42 and the flexible portion 43 and integrally has a reversing portion having a substantially U-shaped cross-section deformed together with the flexible portion 43. To the center of the plane of the flexible portion 43, a poppet 45 for suppressing the protrusion of the diaphragm 41 to a through hole of the oil port 23 is attached. The diaphragm 41 is formed into a diaphragm having a shape of projecting to the gas filled chamber 24 side as a whole in order to cope with high compression. The diaphragm 41 is also referred to as a bladder.

The above-described configuration is basically the same configuration as that of the accumulator 11 of Comparative Example illustrated in FIG. 4. When the operation compression ratio (=Operation pressure/Initial filling gas pressure) increases, the flexible portion 43 of the diaphragm 41 is greatly displaced to the gas filled chamber 24 side, so that the reversing degree of the reversing portion 44 increases at this time, whereby the reversing portion 44 is pressed against the inner peripheral surface of the diaphragm holder 31. In the accumulator 11 illustrated in FIG. 4, an overstress is generated in the reversing portion 44. The repetition thereof leads to a breakage of the diaphragm 41 in some cases. This embodiment takes the following measure against the problem.

As illustrated in FIG. 1, the accumulator 11 of this embodiment is provided with a stress relaxing member 51 reducing a stress generated in the diaphragm 41 on the inner surface of the accumulator housing 21. Due to the fact that, when the flexible portion 43 of the diaphragm 41 is displaced to the gas filled chamber 24 side by a pressure fluctuation inside the accumulator housing 21, the flexible portion 43 and the reversing portion 44 of the diaphragm 41 contact the stress relaxing member 51, the stress relaxing member 51 regulates the deformed attitude of the flexible portion 43 and the reversing portion 44 to stop the deformation to thereby reduce the deformation amount.

The stress relaxing member 51 is disposed in the gas filled chamber 24. The stress relaxing member 51 is disposed at a position ranging from the inner periphery of the diaphragm holder 31 to the inner periphery of the curved surface 27 on the gas filling opening 22 side (upper side in the figure) of the diaphragm holder 31 and on the gas filling opening side in the accumulator housing 21. The stress relaxing member 51 is fixed to the diaphragm holder 31 and the accumulator housing 21.

The stress relaxing member 51 is annularly formed of resin or rubber and integrally has a thin portion 52 disposed on the inner periphery of the diaphragm holder 31 and a thick portion 53 disposed on the inner periphery of the curved surface 27 on the gas filling opening 22 side of the diaphragm holder 31 and on the gas filling opening side in the accumulator housing 21. The stress relaxing member 51 has an outer peripheral surface having a cylindrical surface shape contacting the inner peripheral surface of the hook 33 in the diaphragm holder 31, an end surface having a planar shape perpendicular to the axis contacting the gas filling opening side end surface of the fixing portion 32 in the diaphragm holder 31, an outer peripheral curved surface contacting the curved surface 27 on the gas filling opening side in the accumulator housing 21, and further an inner peripheral surface. The inner peripheral surface is formed as an annular contact surface 55 which the diaphragm 41 separably contacts in deformation.

The contact surface 55 is formed into an inclined surface of a tapered shape in a direction where the inner diameter dimension gradually reduces as the contact surface 55 is away from the reversing portion 44 of the diaphragm 41 in the axial direction, i.e., from the oil port 23 side to the gas filling opening 22 side. The inclined surface may have a linear cross-section but is formed to have a convex arc-shaped cross-section in this embodiment.

The stress relaxing member 51 is formed into a shape imitating the deformation position of the diaphragm 41 as a whole (structure of being provided along the shell 26 and becoming thin toward the oil port side end of the diaphragm holder 31). The stress relaxing member 51 is also referred to as a buffer member.

In the accumulator 11 having the above-described configuration, when the flexible portion 43 of the diaphragm 41 is displaced to the gas filled chamber 24 side by a pressure fluctuation inside the accumulator housing 21, the flexible portion 43 and the reversing portion 44 of the diaphragm 41 contact the contact surface 55 of the stress relaxing member 51. The deformed attitude of the flexible portion 43 and the reversing portion 44 is regulated by the contact, so that the deformation is stopped, whereby the deformation amount is reduced. As a result, the accumulator 11 can reduce the internal stress generated in the diaphragm 41, suppress a breakage of the diaphragm 41, and improve the durability of the diaphragm 41.

Figure 6:
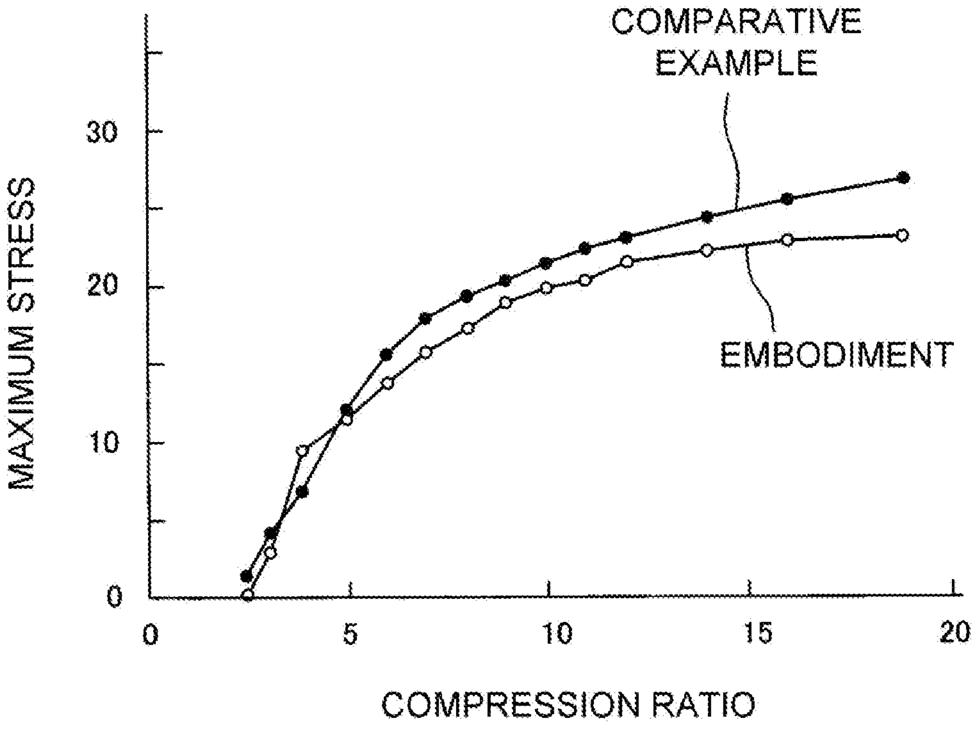
FIG. 6 is a graph illustrating comparison test results.

When the accumulator (with the stress relaxing member) of this embodiment and the accumulator (with no stress relaxing member) of Comparative Example illustrated in FIG. 4 are compared, the internal stress (maximum stress) generated in the diaphragm 41 is smaller in the accumulator of this embodiment as illustrated in the graph of the comparison test results of FIG. 6. Therefore, the effect by the stress relaxing member 51 is confirmed.

In the implementation, the contact surface 55 set as the inner peripheral surface of the stress relaxing member 51 is not formed into the inclined surface of the tapered shape in which the inner diameter dimension gradually reduces from the oil port 23 side to the gas filling opening 22 side as in this embodiment and can be formed into a cylindrical surface (straight surface in the axial direction) parallel to an accumulator center axis O. In this case, the internal stress (maximum stress) generated in the diaphragm 41 contrarily exceeds that of the accumulator (with no stress relaxing member) of Comparative Example illustrated in FIG. 4 in some cases. Therefore, it is preferable that the contact surface 55 set as the inner peripheral surface of the stress relaxing member 51 is formed into the inclined surface of the tapered shape as in this embodiment.

The inclined surface of the tapered shape may be set not on the entire surface but on only a part of the contact surface 55. FIG. 2 illustrates an example in this case. The contact surface 55 is formed by a combination of a straight surface in the axial direction 56 at a position relatively close to the diaphragm 41 and an inclined surface 57 at a position relatively distant from the diaphragm 41. In the inclined surface 57, the inner diameter dimension gradually reduces as the inclined surface 57 is away from the diaphragm 41 in the axial direction, i.e., from the oil port 23 side to the gas filling opening 22 side. The inclined surface 57 may have a linear cross-section but is formed to have a concave arc-shaped cross-section in this embodiment. In the example illustrated in FIG. 2, the oil port side end (lower end in the figure) of the stress relaxing member 51 projects to the oil port 23 side (lower side in the figure) relative to the oil port side end of the diaphragm holder 31. A contact surface extension portion 58 having an arc-shaped cross-section is provided here. The diaphragm 41 contacts the contact surface 55 containing the contact surface extension portion 58, the straight surface in the axial direction 56, and the inclined surface 57.

The invention claimed is:

1. An accumulator comprising:

an accumulator housing;

an annular diaphragm holder fixed to an interior surface of the accumulator housing;

a flexible diaphragm provided inside the accumulator housing in such a manner as to divide an inside of the accumulator housing, and end of the flexible diaphragm being sandwiched between the annular diaphragm holder and the interior surface of the accumulator housing; and a resin or rubber stress relaxing member provided inside the accumulator housing and regulating a deformed attitude of the diaphragm deformed by a pressure fluctuation inside the accumulator housing by contact of the diaphragm with the stress relaxing member, the stress relaxing member including a first portion that extends along the annular diaphragm holder and a second portion that extends along the interior surface of the accumulator housing, and a contact surface of the stress relaxing member that is configured to contact the diaphragm and that connects the first portion to the second portion is convexly formed such that the contact surface protrudes in a direction toward an interior of the accumulator housing.

2. The accumulator according to claim 1, wherein an inner diameter dimension of the convexly formed contact surface gradually reduces as a distance between convexly formed contact surface and the diaphragm increases in an axial direction away from the diaphragm.

* * * * *